Oct. 9, 1962     I. L. JOY     3,057,189
ULTRASONIC INSPECTION SYSTEM
Filed Aug. 14, 1957     3 Sheets-Sheet 1

Inventor
Ivan L. Joy
By Mann, Brown & McWilliams
Attorneys

Oct. 9, 1962   I. L. JOY   3,057,189
ULTRASONIC INSPECTION SYSTEM
Filed Aug. 14, 1957   3 Sheets-Sheet 2

Inventor
Ivan L. Joy
By Mann, Brown & McWilliams
Attorneys

Oct. 9, 1962  I. L. JOY  3,057,189
ULTRASONIC INSPECTION SYSTEM
Filed Aug. 14, 1957  3 Sheets-Sheet 3

Inventor
Ivan L. Joy

United States Patent Office 3,057,189
Patented Oct. 9, 1962

3,057,189
ULTRASONIC INSPECTION SYSTEM
Ivan L. Joy, 1616 W. Dudley Road, Topeka, Kans.
Filed Aug. 14, 1957, Ser. No. 678,152
4 Claims. (Cl. 73—67.8)

This invention relates to inspection systems for locating discontinuities in a medium and, more particularly, is concerned with improving the range resolution in such systems to permit greater accuracy.

The invention finds particular application in ultrasonic systems for the inspection of solid bodies wherein high resolution has been especially elusive and difficult to realize because of the inherent tendency of electromechanical transducers to "ring" even after the electrical actuating signal has been removed. While the avoidance of the difficulties, so long associated with transducer ringing, is a prime factor in the high resolution characteristics of the present system, the system, inherently and independently of ringing difficulties, achieves high resolution without impairing sensitivity and, thus, useful applications for the invention exist in any system which is concerned with resolution problems; for example, radar or sonar.

From their inception, pulse-type ultrasonic systems have characteristically exhibited poor range resolution. The basic reason for this resides in the fact that resolution is dependent upon the length of the test pulse and even in present day pulse-type ultrasonic systems, it is possible to achieve resolutions only on the order of 5 to 20 microseconds at 2.5 megacycles, due, in part, to the ringing time of the electromechanical transducer. Some workers in this field have turned to F.M. ultrasonic systems which, theoretically, have superior range resolution characteristics and, while some improvement in resolution can be realized with F.M., it has involved a serious sacrifice in sensitivity.

The principal object of the present invention is to overcome the resolution problems of prior art systems without impairing sensitivity.

Generally speaking, the system of the invention utilizes an F.M. pulse which is transmitted into the medium under inspection and subsequently detected by an angle-modulation-sensitive receiver. The F.M. pulse and angle-modulation-sensitive receiver are correlated so that the receiver responds only to a brief portion of the pulse, which is itself quite short. Short pulses permit high-strength signals, which are important for good sensitivity. This basic principle may be embodied in a number of somewhat different arrangements, some of which depend primarily upon precisely controlling the waveform of the transmitted pulse and some of which depend primarily upon the angle-modulation sensitivity of the receiver. In all cases, the invention depends upon generating a pulse having a brief angle-modulated portion to which an angle-modulation-sensitive receiver can respond while excluding the remainder of the pulse.

Other objects and advantages of the invention will become apparent during the course of the following description.

In the accompanying drawings forming a part of this specification and in which like numerals are employed to designate like parts throughout the same, FIG. 1 is a generalized block diagram of the present system, shown applied to the ultrasonic inspection of a solid body;

FIG. 3 is a block diagram of an alternative form of F.M. pulse generator;

FIG. 3A is a graph of the pulse generated by the FIG. 3 arrangement; and

Figure 1:
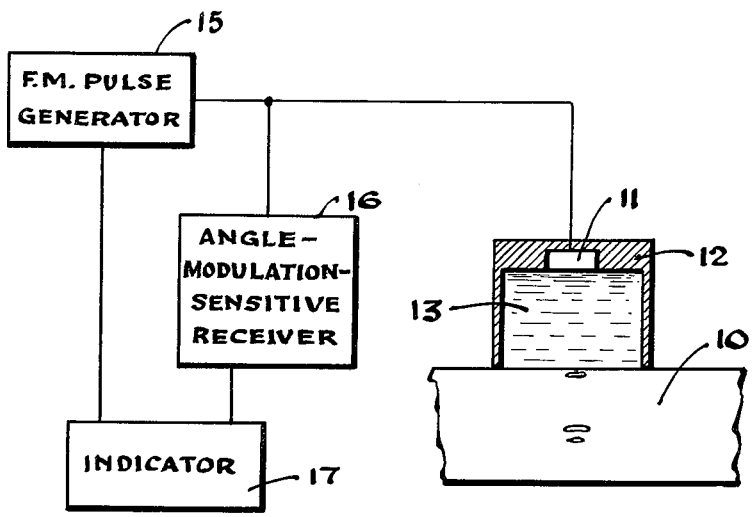

Referring now to the drawings, and to FIG. 1 in particular, the basic elements of the present invention are shown in a simplified block diagram form as applied to an ultrasonic system for inspecting the interior of a solid body 10. A transducer 11 is shown mounted in a holder 12 that confines a coupling liquid 13, which may be, for example, water. The transducer 11 is usually a piezo-electric crystal that responds to actuation by electrical signals to produce a series of mechanical vibrations that are transmitted through the couplant 13 and into the body 10.

It is to be understood that the transducer need not be spaced from the body 10, as is shown, but it could readily be in flush contact with the body through a film of oil or other suitable coupling liquid. The arrangement of the holder may be variously modified, and there may or may not be relative movement between the crystal 11 and the body under test. It should also be understood that, while, in the system illustrated, the transducer 11 serves as both the sender and as the receiver of the mechanical vibrations, the invention is equally applicable to systems which employ separate sending and receiving transducers. Depending upon the type of body under test and the nature of the test, the sending and receiving transducers may be the same physical transducer or may be separate.

In general, in an echo-type ultrasonic setup, the application of electrical energy to an electromechanical sending transducer causes the transducer to produce a series of vibrations that is transmitted into and travels through the body under test for reflection from any discontinuities present in the body. After reflection, the traveling vibrations are sensed by a receiving transducer which produces an electrical output corresponding to the waveform of the vibrations. It should be apparent that if there are a number of flaws or discontinuities at only slightly different ranges in a particular region of the body, the ability of the inspection system to segregate each flaw or discontinuity depends upon whether or not there is an overlapping of the reception intervals for the signals returning from each of the various discontinuities.

Accordingly, the present invention seeks to minimize the portion of the probing pulse that will actuate a receiver, and in its most general form the system includes an F.M. pulse generator 15 periodically producing bursts of energy at any desired repetition rate, an angle-modulation-sensitive receiver 16 arranged to pick up the pulses emitted from the F.M. pulse generator 15 after they have travelled through the medium under inspection, and an indicator 17 synchronized with the generator 15 and responsive to the receiver output for indicating the internal structure of the medium being tested. The invention achieves remarkably good range resolution by minimizing the portion of the transmitted pulse that is responded to by the receiver, and this is done by introducing a certain angle modulation into the transmittetd pulse for detection by the receiver.

As will become apparent, the F.M. pulse generator 15 may produce an electrical output that itself contains the desired angle modulation and that, hence, will cause the transducer to respond and produce mechanical vibrations that also include this angle modulation, or the F.M. pulse generator may produce bursts of energy which, while they do not themselves include any of the desired angle modulation, nevertheless are effective when applied to an electromechanical transducer that is operatively coupled to a body under test to cause the transducer to develop a burst of mechanical vibrations that does include the desired brief portion of angle modulation. This phenomenon wherein the transducer itself introduces the necessary angle modulation is apparently not present in radar systems so that in radar the electrical form of the signal must contain the angle modulation. It is to be understood, however, that the terms, "F.M. pulse," and "F.M. pulse generator," as used in the specification and claims, are intended, unless clearly indicated to the contrary, to include both the situation where the generated electrical pulse is itself angle-modulated and the situation where the generated electrical signal, while not itself angle-modulated, is capable of actuating a transducer to develop an output having angle modulation.

Figure 2:
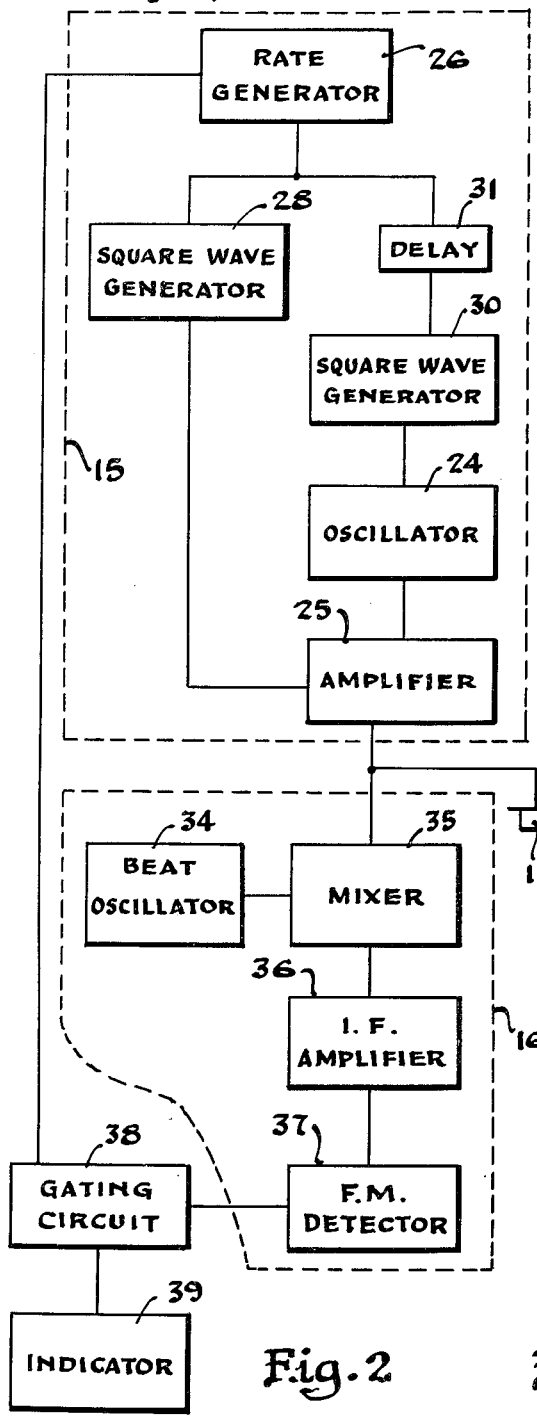
FIG. 2 is a block diagram of a preferred form of the invention, also shown applied to an ultrasonic inspection system.
Figure 2A:
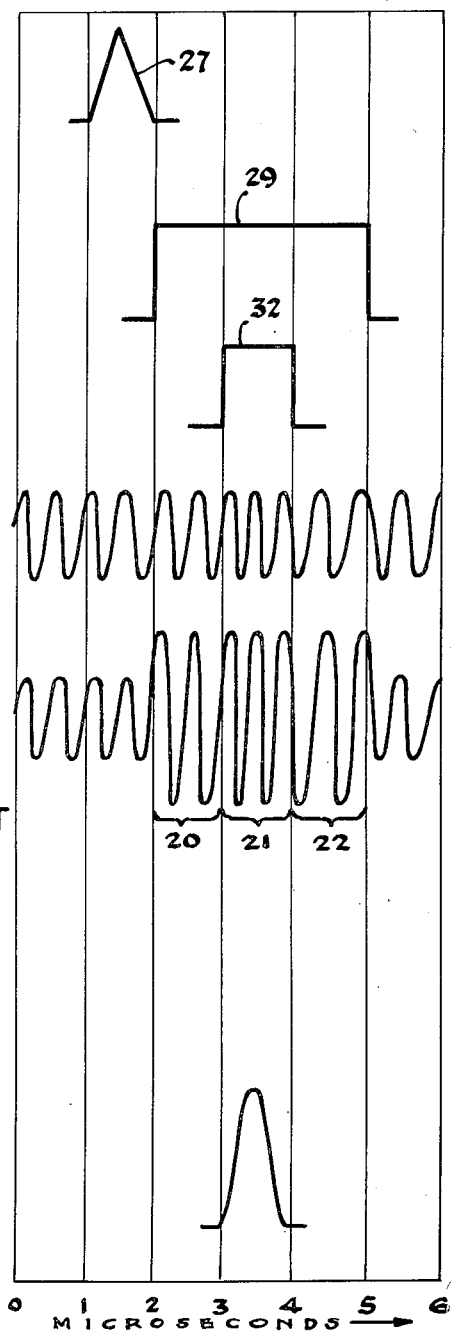
FIG. 2A illustrates graphical representations of various energy conditions in the system of FIG. 2.

In the form of the invention shown in FIG. 2, it is preferred that the transducer 11, which is preferably a barium titanate type of piezoelectric crystal, have a resonant frequency on the order of 2.5 megacycles and it is actuated for approximately two cycles by a signal portion 20 having a frequency of 2.4 megacycles. Then, as shown at 21, the actuating signal shifts in frequency to 2.6 megacycles for approximately two cycles, and finally, as indicated at 22, the actuating signal is shifted back to 2.4 megacycles. The portions 20, 21 and 22 collectively comprise an F.M. pulse, the major portion of which is of a uniform frequency, with a minor portion 21 representing a brief instant of angle modulation.

To produce this F.M. pulse, a continuously running oscillator 24 having a normal output at a frequency of 2.4 megacycles supplies energy to the transducer 11 through an amplifier 25 that is operated at high gain for the three-microsecond interval of the F.M. pulse. Approximately in the middle of this interval, the oscillator is shifted in frequency for about one microsecond and oscillates for this brief instant at a frequency of 2.6 megacycles and then is restored to its normal 2.4-megacycle output. The amplifier 25, which connects the output of oscillator 24 to transducer 11, is operated at high gain only during the interval of the F.M. pulse while at all other times it permits only a small amount of the oscillator output to pass to the angle-modulation-sensitive receiver 16 to function as a carrier for preparing the receiver for the F.M. pulse.

In order that there will be no false indications introduced in the system, the low amplitude, or carrier, portion of the output of oscillator 24 is of the same frequency as the beginning and end portions of the F.M. pulse; namely, 2.4 megacycles. Actually, the carrier portion of the wave is present primarily for the purpose of providing reference voltages in the receiver for establishing the conditions necessary to permit the receiver to compare the frequency characteristics of the incoming signals against the frequency characteristics of the signal that is normally present, and, thus, the carrier portion is not a vital factor in the present system. In fact, in systems employing ultrahigh frequencies, the time-constants of the receiver construction may be such that no carrier wave is necessary since the receiver can prepare itself for its comparison function during the initial portion of the F.M. pulse. It may well be that even for the relatively low frequencies such as are employed in ultrasonic systems, an F.M. receiver will be devised which will be capable of loading itself during the initial portion of the F.M. pulse. However, the present system, which utilizes a continuously running oscillator for providing the carrier signal, is actually more stable since it is easier to maintain a desired frequency in the case of a continuously running oscillator than in the case of an intermittent oscillator.

The particular circuitry for generating the characteristic waveform of the F.M. pulse includes a rate generator 26 which periodically develops a sharp triggering pulse 27 that may exist for a time interval on the order of one microsecond, a square wave generator 28 responsive to the output of the rate generator to produce a square wave 29 that may persist for an interval on the order of three microseconds, a second square wave generator 30 connected to the output of the rate generator through an appropriate delay circuit 31 and responsive to produce a square wave 32 that may persist for a time interval on the order of one microsecond, with the timing function of the delay circuit adjusted so that the square wave 32 occurs approximately in the middle of the longer square wave 29. The square wave 29 is applied to and controls the gain of the amplifier 25 while the square wave 32 controls the frequency of oscillation of oscillator 24. These square wave generators 28 and 30 may be of the type shown in FIG. 19–37 on page 435 of the 1950 edition of "Electron Tube Circuits," by Samuel Seeley. Conventionally, the frequency of the oscillator 24 may be varied by applying the controlling signal 32 to a suitable reactance component of the oscillator.

When an F.M. pulse that has passed through the medium under test is detected by an angle-modulation-sensitive type receiver, the receiver will respond only to the brief portion of the pulse that is shifted in frequency so that approximately only a two-cycle signal actuates the receiver. Actually, the receiver responds once during the transition from wave portion 20 to 21 and again during the transition from wave portion 21 to 22, but not during wave portion 21. Due to the demodulation in the receiver, the discrete responses merge to form a single one-microsecond-long indication. In the example given, this amounts to an approximately one-microsecond interval and corresponds to a resolution, in the ultrasonic testing of steel bodies, on the order of ⅛″. For even better resolution, equipment capable of handling and responding to a single cycle or less of angle modulation could be employed.

Since it is easier to effect such a brief shift than it is to start and stop a pulse of corresponding length, the invention offers decided improvements in the resolution of inspection systems such as radar, where it is this ability to generate a short pulse that is the primary limiting factor. It will also become apparent that the ringing of the transducer in no way affects the effective length of the detected signal, and the avoidance of this ringing problem in ultrasonic applications is of major importance.

With this arrangement of FIG. 2, the angle-modulation-sensitive receiving device 16 preferably includes a conventional beat frequency oscillator 34, a mixer 35, an I.F. amplifier 36, and an F.M. detector 37. The beat frequency oscillator 34 may have an output of 12.5 megacycles which is fed into the mixer 35 to beat with the approximately 2.5 megacycle signals, with the amplifier 36 being tuned to the difference frequency to provide an output on the order of 10 megacycles. Any of the following may be employed for the F.M. detector: either the discriminator shown in FIGS. 17–30 on page 388 of the Seeley reference or the discriminator shown in FIGS. 8–24 on page 417 of the 1943 edition of "Practical Radio Engineering," by Nilson and Horning; the ratio detector shown in FIG. 33 on page 849 of the 1950 edition of "Radio Engineering Handbook," by Henry; the synchronous oscillator detector shown in FIG. 68 on page 518 of the Henny reference; and the double-band pass channel detector described on page 513 of the Henny reference.

In the usual ranging system, the receiver will include a gating circuit such as shown at 38, with the gating circuit passing those portions of the output of the F.M. detector 37 that are desired. The output from the gating circuit is fed to an indicator 39 which may comprise either a recording pen or a cathode ray oscilloscope, or both, and the latter type of indicator may be controlled by a sweep circuit synchronized with the rate generator 26 for giving a visual picture of range and, hence, a visual picture of the internal structure of the body under test in the case of an ultrasonic testing system.

FIG. 3 illustrates a simplified form of F.M. pulse generator that may be substituted for the F.M. pulse generator 15 of FIG. 2 and that comprises a rate generator 26 producing conventional periodic pulses 27 which are applied directly to a first thyratron pulse oscillator 40 and which are also applied through a suitable delay circuit 41 to a second thyratron pulse oscillator 42. These pulse oscillators may be of the type shown in copending application Serial No. 488,348, filed February 15, 1955, now Patent No. 2,852,676. The first pulse oscillator 40 shocks the crystal into oscillation, and it may again be assumed that the crystal has a resonant frequency on the order of 2.5 megacycles, and the timing function of the delay circuit is such that the second pulse oscillator 42 comes into action after approximately two cycles of ringing of the crystal. The second oscillator is arranged to generate a higher amplitude output and, in effect, it drowns out the first oscillator and causes the crystal to ring at a shifted frequency that is slightly different than its resonant frequency. The effect of the second oscillator is dissipated in two or three cycles and the crystal again returns to ringing at its own resonant frequency.

It will be apparent, therefore, that an F.M. pulse substantially similar to that produced by the FIG. 2 embodiment will be generated by the arrangement of FIG. 3. The actual pulse is shown in FIG. 3A and consists of beginning and ending portions 44 and 45, respectively, each being of approximately two cycles' duration and being of the resonant frequency of the crystal; namely, 2.5 megacycles, with approximately a two-cycle intermediate portion 46 that may be of a slightly different frequency, on the order of 2.6 megacycles. As discussed previously, a carrier signal will usually be required for loading the receiver, and, accordingly, a 2.5 megacycle, continuously running oscillator 43 having a low-amplitude output signal is connected to the system.

Figure 4:
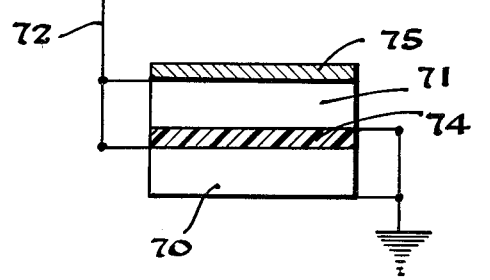
FIG. 4 is a diagram of a preferred connection and arrangement of transducer crystals for use in ultrasonic systems in accordance with the present invention.

In the high resolution F.M. puse system of the present invention, it is advantageous to employ a more efficient wide-band transducer arrangement in those systems which use wave train excitations for the crystal as distinguished from the use of a square wave or other type of half-wave wave train inasmuch as a wide-band arrangement is best able to follow the frequency variations that are inherent in such systems. One such preferred crystal arrangement is shown in FIG. 4 as comprising first and second piezoelectric crystals 70 and 71, respectively, with the connections from the electrical actuating source arranged so that the modes of expansion of the crystal are polarized additively; thus the top faces of both crystals are connected to the live conductor 72 while the bottom faces of both crystals are connected together and, preferably, are arranged to be at ground potential during testing operations to simplify insulation problems. The crystals are bonded together, as indicated at 74, and this bonding material may either be neoprene, rubber loaded with powdered lead, or cement loaded with powdered material. These various materials introduce a desirable dampening characteristic to further improve the band width of the complete assembly. It is also preferred to employ a backing material 75, and for this purpose it is preferred to use powdered iron in an epoxy resin binder.

In the illustrated arrangement of FIG. 4, the crystals 70 and 71 may have resonant frequencies on the order of 3 megacycles and 7 megacycles, respectively, so that they have resonant frequency points at 2.5, 3, 7, 10, and associated harmonics, and when they are actuated by any of the arrangements of FIGS. 1, 2, or 3, they will convert the F.M. pulses from electrical form to mechanical form in a more exact and efficient manner.

It should be understood that the description of the preferred form of the invention is for the purpose of complying with Section 112, Title 35, of the U.S. Code and that the claims should be construed as broadly as prior art will permit.

I claim:

1. In an ultrasonic system for the internal inspection of bodies, apparatus having high-range resolution and signal sensitivity and comprising an electromechanical transducer for mechanical coupling to a body under test, a continuously running oscillator connected for normally applying a fixed frequency output signal to said transducer to produce corresponding vibration of said transducer, first means connected to increase the amplitude of the signal applied to said transducer for a short interval, second means connected to frequency modulate the signal applied to said transducer for a shorter interval, means including a rate generator connected to said first and second means for causing said second means to operate during the interval of operation of said first means, an F.M. receiver device connected to said transducer to respond to frequency modulated signals to which said transducer is subjected for producing output corresponding to each distinct frequency modulated signal portion, and means for visually indicating each separate increment of output.

2. In an ultrasonic system for the internal inspection of bodies, apparatus having high-range resolution and signal sensitivity and comprising an electromechanical transducer for mechanical coupling to a body under test, said transducer having a characteristic sustained ringing that impairs its range resolution in conventional pulse-echo ultrasonic apparatus, signal generating means for producing a continuous carrier wave signal having a substantially fixed carrier frequency and having periodically spaced momentary signal portions at a substantially fixed shifted frequency, means connecting said carrier wave signal from said signal generating means to said transducer to excite said transducer for developing a mechanical vibrational wave substantially corresponding to the frequency pattern of said carrier wave signal, an F.M. receiver device connected to said transducer to respond momentarily each time said mechanical vibrational wave shifts from said carrier frequency to said shifted frequency, and means for visually indicating each such response of said receiver device.

3. In an ultrasonic system for the internal inspection of bodies, apparatus having high-range resolution and signal sensitivity and comprising an electro-mechanical transducer for mechanical coupling to a body under test, said transducer having a characteristic sustained ringing that impairs its range resolution in conventional pulse-echo ultrasonic apparatus, signal generating means for producing a continuous carrier wave signal having a substantially fixed carrier frequency and having periodically spaced momentary signal portions at a substantially fixed shifted frequency and at substantially increased amplitude, means connecting said carrier wave signal from said signal generating means to said transducer to excite said transducer for developing a mechanical vibrational wave substantially corresponding to the frequency pattern of said carrier wave signal, an F.M. receiver device connected to said transducer to respond momentarily each time said mechanical vibrational wave shifts from said carrier frequency to said shifted frequency, and means for visually indicating each such response of said receiver device.

4. In an ultrasonic system for the internal inspection of bodies, apparatus having high-range resolution and signal sensitivity and comprising an electromechanical transducer for mechanical coupling to a body under test, said transducer having a characteristic sustained ringing that impairs its range resolution in conventional pulse-echo ultrasonic apparatus, signal generating means for producing a continuous carrier wave signal having a substantially fixed carrier frequency, means for momentarily shifting said carrier wave signal to a substantially fixed different frequency and for concurrently amplifying said signal to produce a modified carrier wave signal, a rate generator connected to periodically actuate said last named means, means connecting said modified carrier wave signal to said transducer to excite said transducer for developing a mechanical vibrational wave substantially corresponding to the frequency pattern of said modified carrier wave signal, an F.M. receiver device connected to said transducer to respond momentarily each time said mechanical vibrational wave shifts from said carrier frequency to said shifted frequency, and means for visually indicating each such response of said receiver device.

References Cited in the file of this patent

UNITED STATES PATENTS

| | | |
|---|---|---|
| 2,433,782 | Murdoch | Dec. 30, 1947 |
| 2,451,141 | Wolff | Oct. 12, 1948 |
| 2,525,328 | Wolff | Oct. 10, 1950 |
| 2,593,865 | Erdman | Apr. 22, 1952 |
| 2,624,876 | Dickie | Jan. 6, 1953 |
| 2,625,035 | Firestone | Jan. 13, 1953 |
| 2,769,158 | Schultz | Oct. 30, 1956 |